Aug. 8, 1967 R. F. HUBER 3,335,215
STRESS RELIEF APPARATUS
Filed July 29, 1965
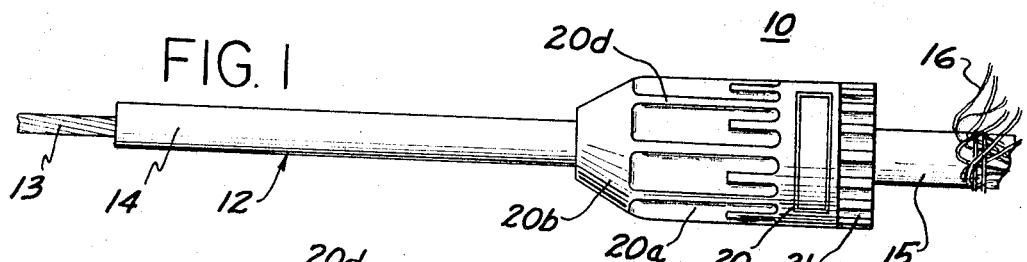
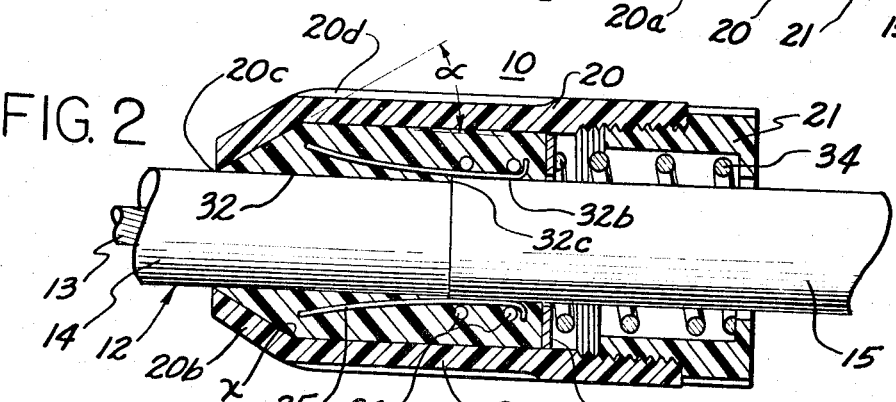
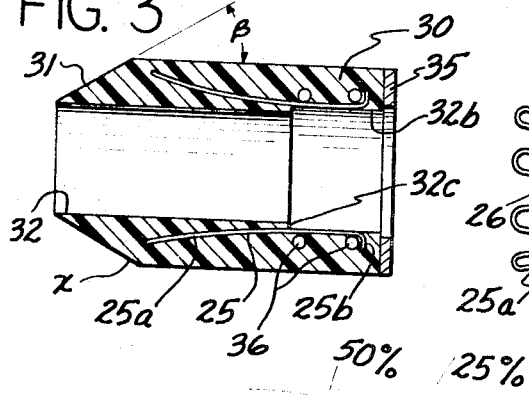
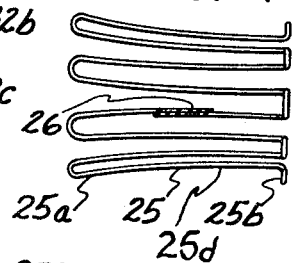
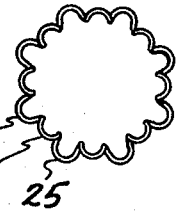
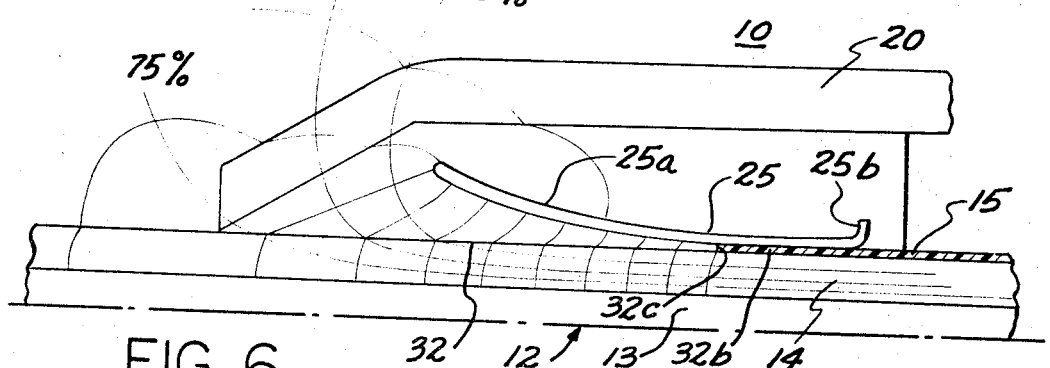
INVENTOR.
RONALD F. HUBER
BY Mason, Kolehmainen,
Rathburn & Wyss
ATTORNEYS 3,335,215
STRESS RELIEF APPARATUS
Ronald F. Huber, Evanston, Ill., assignor to Joslyn Mfg. and Supply Co., Chicago, Ill., a corporation of Illinois
Filed July 29, 1965, Ser. No. 475,803
10 Claims. (Cl. 174—73)

ABSTRACT OF THE DISCLOSURE

A preformed stress relief apparatus terminates the end of a shielded high voltage electrical cable. The stress relief includes a filler carried on the cable in intimate air-free sealing relation therewith and includes a segmented stress relief cone embedded therein.

---

The present invention relates to a new and improved stress relief apparatus, and, more particularly, to a new and improved apparatus for the stress relief termination of a high voltage shielded power cable.

There is presently an increasing trend toward the transmission and distribution of electric power by means of underground residential distribution cables in order to avoid the undesirable features of overhead lines. Furthermore, in order to transport the ever increasing quantity of electrical energy demanded, it becomes necessary to convey it at higher and higher voltages.

Coaxial power cables having a central conductor surrounded by insulation and an outer conducting sheath have been extensively employed in the underground transmission of electrical energy. Such cables must be terminated in order to make necessary connections to surface loads, switch gear, and the like. Cable terminations operating at voltages above 5000 volts give rise to several problems which become more severe as the operating voltage is increased. First, the conducting sheath must be removed for some distance from the actual terminal in order to expose sufficient dielectric insulation to control surface leakage and to prevent flashover. This exposed dielectric structure should be comparable in insulation value to the basic insulation level of other equipment to which the cable is connected.

Secondly, in the region where the conducting sheath is discontinued, the insulation and the air surrounding it are subjected to electrical gradients which may be sufficiently high to produce corona. The term "corona" refers to a condition involving high ionization of gas molecules, ultraviolet radiation, and the formation of ozone, all of which are deleterious to cable insulation. Corona is also undesirable because it is the source of radio interference. In the application of shielded power cables rated 5000 volts and below, no attempt is made to relieve the high voltage stresses at the terminus of the shield because the stresses are generally low enough to preclude damage to the cable insulation. With cables rated higher than 5000 volts, the stresses at the terminus of the shield are generally high enough to be detrimental to the cable insulation and it is general practice to provide some means of stress relief.

One known method of providing stress relief is to form a double cone of insulating tape at the terminus of the shield. A flexible metallic tape is then wrapped over a portion of the shield and up the adjacent cone to the maximum diameter where the metallic tape is terminated and kept from unwinding by soldering the tape to itself, generally also down the cone, and to the cable shield. This process is not only time consuming but requires careful application by one skilled in the art. Any introduction of voids within the insulation complex may lead to corona cutting and eventual cable insulation failure. In addition, moisture and contaminants may enter between the insulating tape layers and the interface with the cable insulation to upset the stress relief configuration.

Another known method of stress relief involves an insulating pennant in lieu of insulating tape. This requires careful application to avoid the same troubles as noted above.

Another known method of stress relief comes in the form of a kit which provides a metallized plastic cone to be embedded in a plastic dielectric which is mixed and injected into a mold on the cable at the time of application. This, too, requires careful attention to methods to preclude improper mixing and inclusion of voids within the plastic insulation.

Yet another known method of stress relief is a device consisting of two copolymeric elastomers, one insulating and one conducting, so manufactured as to have built-in stress relief. After cable preparation, this device is slipped on to the cable to contact the cable shield. By virtue of the tight fit over the cable insulation and the elastomeric action of the copolymers, the air is wiped out of the interface region between the cable insulation and the copolymer insulation. However, the entire concept is based upon the continuing tight fit of the cable. Any relaxation of the elastomer from aging, temperature changes, chemical changes or any other detrimental action will permit the ingress of moisture or contaminants to the aforementioned interface and upset the stress relief configuration, permit leakage currents over undesirable surfaces, and, on flashover, may permit damaging currents within the insulation rather than around it. Further relaxation will permit the ingress of air with resulting corona damage to the cable insulation.

It is therefore an object of the present invention to provide a new and improved stress relief apparatus.

It is an object of the present invention to provide new and improved stress relief apparatus for terminating a shielded high-voltage, solid-insulated, concentric-neutral electrical cable.

Yet a further object of the present invention is to provide an apparatus for stress relief of a shielded high-voltage power cable which will overcome the above-mentioned difficulties.

Yet another object of the present invention is to provide an apparatus for stress relieving a high-voltage cable of the type adapted for underground residential distribution.

Further objects and advantages of the present invention will become apparent as the following description proceeds and the features of novelty which characterize the invention will be pointed out with particularly in the claims annexed to and forming a part of this specification.

In accordance with these and many other objects of the present invention, the preformed stress relief apparatus embodies a plastic housing enclosing an elastomer filler in substantially air-free interfacial engagement. Embedded within the elastomer filler is a flared wire form defining a stress relief cone. The elastomer filler is provided with a longitudinal bore adapted to receive the cable, and the wire form at one end extends along the inner surface of the bore for engaging the conductive shielding of the cable.

In a preferred embodiment of the present invention, the stress relief apparatus embodies an air-wiping, spring-loaded principle to assure a substantially air-free interfacial engagement between the filler and housing. More specifically the filler is chamfered at one end into a generally conical shape, and the outer wall of the filler and the inner wall of the housing are in normally diverging relation in a direction extending longitudinally of the filler towards each end. Resilient means are provided for applying force on the filler to bring and maintain the diverging surfaces into substantially air-free interfacial engagement with one another.

For a better understanding of the present invention reference may be had to the accompanying drawing wherein:

FIG. 1 represents a cable terminus employing a stress relief apparatus according to the present invention;

FIG. 2 is a cross-sectional view of the stress relief apparatus of FIG. 1, drawn to a larger scale;

FIG. 3 is a cross-sectional view of the elastomer filler and stress relief cone of FIG. 2, illustrated removed from the housing of the apparatus;

FIG. 4 illustrates the segmented wire stress cone;

FIG. 5 is an end view of the stress cone of FIG. 4; and

FIG. 6 shows a typical voltage distribution through the stress relief cone.

Referring now to the drawing and particularly to FIG. 1, there is illustrated a stress relief apparatus 10 on the terminus of a high voltage electrical cable 12. The cable 12 is of the underground residential distribution type having a central conductor 13 encased in a solid insulation 14 with a neutral outer sheathing or conducting layer 15. Commercially the cable 12 would additionally be provided with conducting neutral wires 16, FIG. 1. In a known commercial underground distribution cable, the sheathing 15 is formed of a polyethylene conducting layer.

Referring now to the stress relief apparatus 10, as best illustrated in FIG. 2, the stress apparatus 10 includes an outer housing 20 of suitable insulating material such as ABS plastic (Acrylonitrile Butadiene Styrene) containing ultraviolet inhibitors. The housing 20 has a generally cylindrical portion 20a with an inwardly tapering end portion 20b of somewhat conical shape and provided with a central aperture 20c to receive the cable 12. The outer surface of the housing 20 may be provided with a plurality of longitudinal flutes 20d which serve to provide a handhold for the housing 20 and to provide for removal of the housing 20 from the mold. A screw cap 21 is provided at the end of the housing 20 remote from the conical portion 20b and is screwthreaded within the housing 20.

To provide for the stress relief, the stress relief apparatus 10 includes a flared wire form or stress relief cone 25, best illustrated in FIGS. 4 and 5. The wire cone 25 is formed of a continuous length of conducting wire extending longitudinally back and forth into a generally cylindrical shape and flared outwardly at one end 25a which is positioned toward the tapered end of the housing 20. The two ends of the wire forming the wire cone 25 are soldered together, as indicated at 26, FIG. 4, to form a continuous segmented structure. The other end of the wire cone 25 remote from the flares 25a has a generally cylindrical portion 25d terminating with the segments bent radially outwardly as at 25b to provide means for more positively retaining the wire cone within the stress relief apparatus 10.

The wire cone 25 is embedded in an elastomer filler 30 which may be of polyurethane. The filler 30 is provided with a central longitudinal bore 32 having an enlarged countersunk portion 32b and adapted to receive the cable 12. The sheathing 15 is received within the enlarged portion 32b against a shoulder 32c formed at the inner end of the enlarged portion. The wire cone 25 is embedded within the filler 30 with the cylindrical portion 25d of the cone extending along the inner surface of the enlarged portion 32b of the bore 32 for engaging the conductive sheathing 15 of the cable 13.

To provide for a substantially air-free interface between the filler 30 and the housing 20, the angles of the facing surfaces of the filler 30 and housing 20 provide for a normally diverging angle extending from the circular contact line x, FIGS. 2 and 3, between the chamfered portions of the filler 30 and housing 20, and the body portions thereof. More specifically, the filler 30 and housing 20 are provided with slightly different angular slopes to provide the diverging surfaces. In one particular embodiment, the angle α of the chamfer in the housing 20 was 30° from the longitudinal axis while the corresponding angle β in the filler 30 was 32° from the longitudinal axis to provide a 2° divergence between the chamfered interfaces of the filler 30 and housing 20. Additionally, the inner surface of the body portion 20a of the housing 20 was provided with approximately a 1° outward taper on each side of its bore to provide a 1° diverging interface between the adjoining surfaces.

To continuously load the filler 30 to maintain the substantially air-free interface between the filler 30 and the housing 20, there is provided a compression spring 34 between the screw cap 21 and the filler 30. If desired, a canvas-phenolic thrust washer 35 may be provided between the spring 34 and the filler 30.

Elastic rings or bands 36 may encircle the toe end 25b of the wire cone 25 to maintain the cone in proper position on the mandrel while the filler 30 is being cast or molded.

From the above detailed description of the stress relief apparatus, the operation thereof is believed clear. However, briefly, to use, the stress relief apparatus 10, the installer prepares the cable as he would for any termination by stripping the insulation 14 and sheathing 15 as indicated in FIGS. 1 and 2. Grease is applied to the cable and to the polyurethane elastomer filler and the loosely assembled filler 30 is assembled onto the cable and slid into the housing 20. Tightening of the screw cap 21 loads the filler 30 and wipes the air from the stress relief area to provide a corona-free installation.

Advantageously the stress cone is provided by the wire cone 25 embedded in the insulating elastomer filler 30. The cone wires emerge from the filler 30 on the inner circumference thereof at its cylindrical portion 25d to make contact with a cable shielding when the elastomer is installed. Longitudinal compression of the filler in its housing during installation squeezes the filler inwardly to insure pressure contact of the cone on the cable assembly. The ABS plastic provides an inexpensive thermoplastic with a good balance of mechanical, thermal and electrical properties, is readily injection molded, and is not affected by the silicon lubricant or polyurethane with which it must come into contact.

When the polyurethane filler 30 is first inserted into the housing 20, it touches the housing only along the circular line x. As the screw cap 21 is tightened, the filler fills the housing gradually in both directions from the line x because of the diverging surfaces, thereby wiping the air from the contacting surfaces.

FIG. 6 shows a typical voltage distribution across the stress relief apparatus. The dielectric strength of the insulating elastomer filler is not reduced by any interface characteristics such as are present in built-up insulation. The possibility of voids holding entrapped air is virtually eliminated. No high-voltage gradients are developed at the grounding shield end thereby providing a corona-free terminal. The insulation strength is coordinated so that the leakage and flashover path is over the complete housing rather than through the insulation to the cone. This makes it possible to reduce the overall length of the stress relief apparatus.

Although the present invention has been described by reference to only a single embodiment thereof, it will be apparent that numerous other modifications and embodiments will be devised by those skilled in the art which will fall within the true spirit and scope of the present invention.

What is claimed as new and desired to be secured by Letters Patent of the United States is:

1. A preformed stress relief apparatus for terminating the shielding of a shielded high-voltage, solid-insulated, concentric-neutral electrical cable, said apparatus comprising an insulated preformed, tubular elastomer filler having a longitudinal bore adapted to receive a cable in intimate interface air-free sealing relation with the insulation thereof, and having an outer peripheral surface chamfered at one end into a generally conical shape, a segmented stress cone partially embedded in said filler and formed from a continuous length of conducting wire extending longitudinally back and forth into a generally cylindrical shape and flared outwardly at a first end positioned toward said one end of said filler, and including a substantially cylindrical portion terminating in a second end of said cone and extending along the inner surface of said bore for engaging the conductive shielding of a cable; an insulating housing having an internal wall surface, said filler extending into said housing, facing portions of said wall surface and the peripheral surface of said filler normally diverging in a direction extending longitudinally of said filler towards each end thereof; and resilient means for applying gradually increasing force on said filler to move said diverging surfaces into substantially air-free interfacial engagement with one another, said engagement progressively expanding along the length of the filler in the direction of divergence of said surfaces as said force is increased, said resilient means maintaining said force throughout the ambient operating conditions of said apparatus.

2. A preformed stress relief apparatus as set forth in claim 1 above wherein said second end of said cone defines toe portions extending radially outwardly of said cylindrical portion.

3. A preformed stress relief apparatus for terminating the shielding of a shielded high-voltage electrical cable, said apparatus comprising an insulated preformed, tubular elastomer filler having a longitudinal bore adapted to receive a cable in intimate interface air-free sealing relation with the insulation thereof, and having an outer peripheral surface chamfered at one end into a generally conical shape, a segmented stress cone partially embedded in said filler and formed from a continuous length of conducting wire extending longitudinally back and forth into a generally cylindrical shape and flared outwardly at a first end positioned toward said one end of said filler, and including a substantially cylindrical portion terminating in a second end of said cone and extending along the inner surface of said bore for engaging the conductive shielding of a cable; and an insulating housing; said filler extending into said housing.

4. A preformed stress relief apparatus for terminating the shielding of a shielded high-voltage electrical cable, said apparatus comprising an insulated preformed, tubular elastomer filler having a longitudinal bore adapted to receive a cable in intimate interface air-free sealing relation with the insulation thereof, and having an outer peripheral surface chamfered at one end into a generally conical shape, a segmented stress cone partially embedded in said filler having a generally cylindrical shape and flared outwardly at a first end positioned toward said one end of said filler, and including a substantially cylindrical portion terminating in a second end of said cone and extending along the inner surface of said bore for engaging the conductive shielding of a cable; and an insulating housing; said filler extending into said housing.

5. A preformed stress relief apparatus for terminating the shielding of a shielded high-voltage electrical cable, said apparatus comprising an insulated preformed, tubular elastomer filler having a longitudinal bore adapted to receive a cable in intimate interface air-free sealing relation with the insulation thereof; a segmented stress cone partially embedded in said filler and having a generally cylindrical shape and flared outwardly at a first end positioned toward one end of said filler, and including a substantially cylindrical portion extending along the inner surface of said bore for engaging the conductive shielding of a cable; and an insulating housing; said filler extending into said housing.

6. A preformed stress relief apparatus for terminating a high-voltage electrical cable and comprising a preformed elastomer filler having a longitudinal bore adapted to receive a cable in intimate interface air-free sealing relation with the insulation thereof and chamfered at one end, a flared wire form embedded in said filler with the outwardly flared end positioned toward said chamfer, and an outer housing receiving said filler in substantially air-free interfacial engagement.

7. A preformed stress relief apparatus for terminating a high-voltage electrical cable and comprising a preformed elastomer filler having a longitudinal bore adapted to receive a cable in intimate interface air-free sealing relation with the insulation thereof, a flared segmented conducting form embedded in said filler, and an outer housing receiving said filler in substantially air-free interfacial engagement.

8. In combination with a shielded high-voltage, solid-insulated, concentric-neutral electrical cable, a preformed stress relief apparatus for terminating the shielding of said cable comprising a removable, preformed, tubular elastomer filler having a longitudinal bore and an outer peripheral surface and being chamfered at one end into a generally conical shape, said filler being carried on said cable with the end of the cable protruding from said conical end; a segmented stress cone embedded in said filler and formed from a continuous length of conducting wire extending longitudinally back and forth into a generally cylindrical shape and flared outwardly at a first end positioned toward said one end of said filler, the second end of said cone extending along the inner surface of said bore and engaging the conductive shielding of said cable; a housing of Acrylonitrile Butadiene Styrene having an internal wall surface, said cable and filler extending into said housing, facing portions of said wall surface and the peripheral surface of said filler normally diverging in a direction extending longitudinally of said filler towards each end thereof, and resilient means for applying gradually increasing force on said filler to move said diverging surfaces into substantially air-free interfacial engagement with one another, said engagement progressively expanding along the length of the filler in the direction of divergence of said surfaces as said force is increased, said resilient means maintaining said force throughout the ambient operating conditions of said apparatus.

9. In combination with a shielded high-voltage electrical cable, a preformed stress relief apparatus for terminating the shielding of said cable comprising a preformed, tubular elastomer filler having a longitudinal bore and an outer peripheral surface and being chamfered at one end into a generally conical shape, said filler being carried on said cable in intimate interface air-free sealing relation with the insulation thereof with the end of the cable protruding from said conical end; a segmented stress cone embedded in said filler and formed from a continuous length of conducting wire extending longitudinally back and forth into a generally cylindrical shape and flared outwardly at a first end positioned toward said one end of said filler, the second end of said cone extending along the inner surface of said bore and engaging the conductive shielding of said cable; an insulating housing having an internal wall surface, said cable and filler extending into said housing, facing portions of said wall surface and the peripheral surface of said filler engaging in substantially air-free interfacial engagement with one another.

10. In combination with a shielded high-voltage electrical cable, a preformed stress relief apparatus for terminating the shielding of said cable comprising a preformed, tubular elastomer filler having a longitudinal bore and an outer peripheral surface, said filler being carried on said cable in intimate interface air-free sealing relation with the insulation thereof with the end of the cable protruding from one end thereof; a segmented stress cone embedded in said filler and formed in a generally cylindrical shape and flared outwardly at a first end positioned toward said one end of said filler, the second end of said cone extending along the inner surface of said bore and engaging the conductive shielding of said cable; an insulating housing having an internal wall surface, said cable and filler extending into said housing in substantially air-free interfacial engagement with one another.

References Cited

UNITED STATES PATENTS

| 2,280,711 | 4/1932 | Macklett et al. | 174—72 X |
| 2,322,702 | 6/1943 | Peterson | 174—73 |
| 2,945,913 | 7/1960 | Conangla | 174—73 |

FOREIGN PATENTS 564,029  6/1957  Italy.

LARAMIE E. ASKIN, *Primary Examiner.*